US010118578B2

(12) United States Patent
Yabu et al.

(10) Patent No.: US 10,118,578 B2
(45) Date of Patent: Nov. 6, 2018

(54) BUMPER BEAM FOR AUTOMOBILE, METHOD FOR MANUFACTURING BUMPER BEAM, AND STRUCTURE FOR MOUNTING BUMPER BEAM IN VEHICLE BODY

(71) Applicant: HONDA MOTOR CO., LTD., Tokyo (JP)

(72) Inventors: Tomoya Yabu, Wako (JP); Shigeto Yasuhara, Wako (JP); Tadayuki Uchida, Wako (JP); Akira Hojo, Wako (JP); Masakazu Kashiwagi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 127 days.

(21) Appl. No.: 15/226,589

(22) Filed: Aug. 2, 2016

(65) Prior Publication Data
US 2017/0036624 A1 Feb. 9, 2017

(30) Foreign Application Priority Data

Aug. 3, 2015 (JP) .................................. 2015-153124

(51) Int. Cl.
*B60R 19/03* (2006.01)
*B60R 19/18* (2006.01)
(Continued)

(52) U.S. Cl.
CPC ........ *B60R 19/03* (2013.01); *B29C 45/14786* (2013.01); *B60R 19/18* (2013.01);
(Continued)

(58) Field of Classification Search
CPC . B60R 2019/1833; B60R 19/02; B60R 19/03; B60R 2019/247; B29L 2031/3044
(Continued)

(56) References Cited

U.S. PATENT DOCUMENTS 4,830,418 A * 5/1989 Gest ........................ B60R 19/26
248/636
5,804,511 A * 9/1998 Kelman ................ B29C 67/246
442/172
(Continued)

FOREIGN PATENT DOCUMENTS

JP S61-161054 U 10/1986
JP 2000-515828 A 11/2000
(Continued)

OTHER PUBLICATIONS

Office Action dated Feb. 22, 2017, issued in counterpart Japanese Patent Application No. 2015-153124, with machine translation. (6 pages).

*Primary Examiner* — Pinel E Romain
(74) *Attorney, Agent, or Firm* — Westerman, Hattori, Daniels & Adrian, LLP (57) ABSTRACT

A bumper beam body 13 and upper and lower parts of a flange portion 22 each contain a continuous fiber reinforced polymer layer 20, and a first flange tip portion 22a made of thermoplastic resin that has an L-shaped cross section extending outward in a vertical direction and then curving outward in a vehicle rear-front direction is connected to edges of the flange portion 22. Thereby, even when continuous fibers and matrix resin of the continuous fiber reinforced polymer layer 20 stick out from the edges of the flange portion 22 as flash, this flash can be covered with the first flange tip portion 22a.

4 Claims, 8 Drawing Sheets

(51) Int. Cl.
*B29C 45/14* (2006.01)
*B29L 31/30* (2006.01)
*B60R 19/24* (2006.01)

(52) U.S. Cl.
CPC ............ *B29L 2031/3044* (2013.01); *B60R 2019/1833* (2013.01); *B60R 2019/247* (2013.01)

(58) Field of Classification Search
USPC .......................................... 296/102; 293/120
See application file for complete search history.

(56) References Cited

U.S. PATENT DOCUMENTS

| | | | | |
|---|---|---|---|---|
| 7,658,421 | B2* | 2/2010 | Hashimoto | B21D 39/06 293/154 |
| 8,071,491 | B2* | 12/2011 | Balthes | B29C 43/021 442/247 |
| 9,376,074 | B2* | 6/2016 | Hundley | B60R 19/18 |
| 9,487,168 | B2* | 11/2016 | Yabu | B60R 19/03 |
| 2008/0048462 | A1* | 2/2008 | Zabik | B60R 19/18 293/120 |
| 2013/0175813 | A1 | 7/2013 | Mana et al. | |
| 2014/0051310 | A1* | 2/2014 | Kunal | B32B 5/02 442/1 |
| 2016/0046248 | A1* | 2/2016 | Fuerst | B60R 19/18 293/121 |
| 2016/0136921 | A1* | 5/2016 | Yasuhara | B32B 5/12 428/77 |

FOREIGN PATENT DOCUMENTS

| | | | |
|---|---|---|---|
| WO | 2015/079876 | A1 | 6/2015 |
| WO | 2015/104889 | A1 | 7/2015 |

* cited by examiner

BUMPER BEAM FOR AUTOMOBILE, METHOD FOR MANUFACTURING BUMPER BEAM, AND STRUCTURE FOR MOUNTING BUMPER BEAM IN VEHICLE BODY

TECHNICAL FIELD

The present invention relates to a bumper beam for an automobile, in which a bumper beam made of fiber reinforced polymer disposed in a vehicle widthwise direction includes: a bumper beam body that has a U-shaped cross section opening toward the inner side in a vehicle rear-front direction; and a flange portion that extends from an edge of the bumper beam body, and the bumper beam body and the flange portion each contain a continuous fiber reinforced polymer layer, and to a method for manufacturing the bumper beam and a structure for mounting the bumper beam in a vehicle body.

CROSS-REFERENCE OF RELATED APPLICATION

This application claims priority of Japanese Patent Application No. 2015-153124 filed in Japan on Aug. 3, 2015, the entire contents of which are incorporated herein by reference.

BACKGROUND OF THE INVENTION

A method of manufacturing a bumper beam is known from Published Japanese Translation of PCT International Application No. 2000-515828 in which thermoplastic resin containing no fiber and thermoplastic resin containing continuous fibers are laid one over the other and press-molded in a press die to manufacture a bumper beam having a two-layered structure composed of a resin layer and a continuous fiber reinforced polymer layer.

Meanwhile, the existing method has the following problem. Specifically, cut end parts of continuous fibers contained in the continuous fiber reinforced polymer layer sometimes stick out from the edges of the product as flash, and this flash might come in contact with the hands of an operator and degrade workability or might degrade the appearance of the product. For this reason, trimming where the edges of the product, at which continuous fibers stick out as flash, are cut into a smooth shape is needed after the product is press-molded, which causes a cost increase due to an increase in processing man-hours.

SUMMARY OF INVENTION

The present invention has been made in view of the foregoing circumstances, and an objective thereof is to prevent continuous fibers from sticking out as flash from edges of a bumper beam containing a continuous fiber reinforced polymer layer while no trimming is required.

In order to achieve the above objective, in accordance with a first embodiment, the present invention proposes a bumper beam for an automobile in which a bumper beam made of fiber reinforced polymer disposed in a vehicle widthwise direction includes: a bumper beam body that has a U-shaped cross section opening toward an inner side in a vehicle rear-front direction; and a flange portion that extends from an edge of the bumper beam body, and the bumper beam body and the flange portion each contain a continuous fiber reinforced polymer layer, the bumper beam being characterized in that a first flange tip portion made of thermoplastic resin that has an L-shaped cross section extending outward in a vertical direction and then curving outward in the vehicle rear-front direction is connected to edges of the flange portion located in upper and lower parts of the bumper beam.

Further, in accordance with a second embodiment, the present invention proposes the bumper beam for an automobile characterized in that, in addition to the configuration according to the first embodiment of the present invention, the bumper beam body and the flange portion each have a two-layered structure made by stacking the continuous fiber reinforced polymer layer and a discontinuous fiber reinforced polymer layer one on top of the other, and the discontinuous fiber reinforced polymer layer in the flange portion is thicker than the discontinuous fiber reinforced polymer layer in the bumper beam body.

Further, in accordance with a third embodiment, the present invention proposes the bumper beam for an automobile characterized in that, in addition to the configuration according to the first or second embodiment of the present invention, the continuous fiber reinforced polymer layer curves smoothly at a boundary between the bumper beam body and the flange portion.

Further, in accordance with a fourth embodiment, the present invention proposes the bumper beam for an automobile characterized in that, in addition to the configuration according to any one of the first to third embodiments of the present invention, a second flange tip portion made of thermoplastic resin that has an I-shaped cross section extending outward in the vertical direction or outward in the vehicle rear-front direction is connected to edges of the flange portion located on both sides of the bumper beam in the vehicle widthwise direction.

Further, in accordance with a fifth embodiment, the present invention proposes the bumper beam for an automobile characterized in that, in addition to the configuration according to any one of the first to fourth embodiments of the present invention, a honeycomb structure made of thermoplastic resin is provided on an outer face of the bumper beam body in the vehicle rear-front direction.

Further, in accordance with a sixth embodiment, the present invention proposes a method for manufacturing the bumper beam for an automobile according to any one of the first to fifth embodiments of the present invention, characterized by including: a first step of hot pressing a prepreg in a press-molding die and thereby molding the bumper beam body and the flange portion; and a second step of injecting thermoplastic resin in a space formed in the press-molding die at positions facing the edges of the flange portion and thereby molding the first flange tip portion.

Further, in accordance with a seventh embodiment, the present invention proposes the method for manufacturing the bumper beam for an automobile characterized in that, in addition to the configuration according to the sixth embodiment of the present invention, the method further includes: a third step of forming a mounting hole in the flange portion after the second step; and a fourth step of fixing a collar in the mounting hole by press fitting or riveting.

Further, in accordance with an eighth embodiment, the present invention proposes the method for manufacturing the bumper beam for an automobile characterized in that, in addition to the configuration according to the sixth or seventh embodiment of the present invention, in the first step, the prepreg is made of a discontinuous fiber prepreg and a continuous fiber prepreg stacked one on top of the other, and a clearance between molding faces of a female die and a male die of the press-molding die at a boundary between the bumper beam body and the flange portion is larger than the clearance in other parts.

Further, in accordance with a ninth embodiment, the present invention proposes a structure for mounting a bumper beam in a vehicle body by which the bumper beam according to any one of the first to fifth embodiments of the present invention is fixed on a body frame member, the structure being characterized in that, when a flanged collar integrally having a flange at an inner end thereof in the vehicle rear-front direction is fitted in a mounting hole provided in the flange portion of the bumper beam and a flanged bolt integrally having a flange is caused to penetrate the flanged collar from an outer side in the vehicle rear-front direction and fastened to the body frame member, an elastic member is interposed between the flange of the flanged bolt and an outer face of the flange portion of the bumper beam in the vehicle rear-front direction.

In this respect, a mounting plate 11a of embodiments corresponds to the body frame member of the present invention, a rear bumper beam 12 of the embodiments corresponds to the bumper beam of the present invention, a continuous fiber prepreg 20' and a discontinuous fiber prepreg 21' of the embodiments corresponds to the prepreg of the present invention, and a flanged collar 23 of the embodiments corresponds to the collar of the present invention.

According to the configuration of the first embodiment of the present invention, the bumper beam made of fiber reinforced polymer disposed in the vehicle widthwise direction includes: the bumper beam body that has a U-shaped cross section opening toward the inner side in the vehicle rear-front direction; and the flange portion that extends from the edge of the bumper beam body, and the bumper beam body and the flange portion each contain the continuous fiber reinforced polymer layer. The first flange tip portion made of thermoplastic resin that has an L-shaped cross section extending outward in the vertical direction and then curving outward in the vehicle rear-front direction is connected to the edges of the flange portion located in the upper and lower parts of the bumper beam. Thereby, even when continuous fibers and matrix resin of the continuous fiber reinforced polymer layer stick out from the edges of the flange portion as flash, this flash can be covered with the first flange tip portion, whereby product quality can be improved while no trimming work for removing flash is required. Moreover, even when the prepreg of the continuous fiber reinforced polymer layer is misaligned in position when it is set inside the die, the first flange tip portion is formed to have an L-shaped cross section and therefore the edges of the prepreg never reach the tip of this L-shaped cross section, whereby the space for molding the first flange tip portion can be secured and the projection of flash can be prevented more reliably.

Further, according to the configuration of the second embodiment of the present invention, the bumper beam body and the flange portion each have a two-layered structure made by stacking the continuous fiber reinforced polymer layer and the discontinuous fiber reinforced polymer layer one on top of the other, and the discontinuous fiber reinforced polymer layer in the flange portion is thicker than the discontinuous fiber reinforced polymer layer in the bumper beam body. Thus, the discontinuous fiber reinforced polymer layer excellent in moldability makes it easy to thicken the flange portion, and the mounting strength of the bumper beam can be increased by the thick flange portion.

Further, according to the configuration of the third embodiment of the present invention, the continuous fiber reinforced polymer layer curves smoothly at the boundary between the bumper beam body and the flange portion. Thereby, it is possible to prevent continuous fibers from being broken due to the sharp curve of the continuous fiber reinforced polymer layer at the boundary part at the time of press-molding the bumper beam in the die.

Further, according to the configuration of the fourth embodiment of the present invention, the second flange tip portion made of thermoplastic resin that has an I-shaped cross section extending outward in the vertical direction or outward in the vehicle rear-front direction is connected to the edges of the flange portion located on both sides of the bumper beam in the vehicle widthwise direction. Thereby, it is possible to cover the entire circumference of the edge of the flange portion of the bumper beam with the first flange tip portion and the second flange tip portion and prevent projection of flash.

Further, according to the configuration of the fifth embodiment of the present invention, the honeycomb structure made of thermoplastic resin is provided on the outer face of the bumper beam body in the vehicle rear-front direction. Thus, in the event of a collision, the honeycomb structure is collapsed, whereby the amount of energy absorption can be increased.

Further, the configuration of according to the sixth embodiment of the present invention includes: the first step of hot pressing the prepreg in the press-molding die and thereby molding the bumper beam body and the flange portion; and the second step of injecting thermoplastic resin in the space formed in the press-molding die at positions facing the edges of the flange portion and thereby molding the first flange tip portion. Thus, the first flange tip portion can be molded by use of the press-molding die for molding the bumper beam body and the flange portion, so that facility cost and processing man-hours can be reduced.

Further, the configuration according to the seventh embodiment of the present invention includes: the third step of forming the mounting hole in the flange portion after the second step; and the fourth step of fixing the collar in the mounting hole by press fitting or riveting. Thus, the mounting strength of the bumper beam to the vehicle body can be increased by reinforcing the mounting hole of the flange portion with the collar.

Further, according to the configuration of the eighth embodiment of the present invention, in the first step, the prepreg is made of the discontinuous fiber prepreg and the continuous fiber prepreg stacked one on top of the other, and the clearance between the molding faces of the female die and the male die of the press-molding die at the boundary between the bumper beam body and the flange portion is larger than the clearance in other parts. Thus, the thickness of the discontinuous fiber reinforced polymer layer at the boundary results in larger than that in other parts, and the thick discontinuous fiber reinforced polymer layer increases the freedom in the deformation of the continuous fiber reinforced polymer layer at the boundary, so that it is possible to prevent continuous fibers from being broken due to the sharp curve of the continuous fiber reinforced polymer layer.

Further, according to the configuration of the ninth embodiment of the present invention, when the flanged collar integrally having the flange at the inner end thereof in the vehicle rear-front direction is fitted in the mounting hole provided in the flange portion of the bumper beam and the flanged bolt integrally having the flange is caused to penetrate the flanged collar from the outer side in the vehicle rear-front direction and fastened to the body frame member, even if the flanged bolt comes in contact with the flanged collar and cannot be screwed further inward and therefore the flanged bolt is unable to fix the flange portion of the bumper beam firmly with its fastening force, rattling of the flange portion of the bumper beam can be prevented and the bumper beam can be fixed firmly by means of the elastic member interposed between the flange of the flanged bolt and the outer face of the flange portion of the bumper beam in the vehicle rear-front direction.

DETAILED DESCRIPTION OF THE INVENTION

First Embodiment

Hereinbelow, a first embodiment of the present invention is described on the basis of FIGS. 1 to 7. Note that, throughout this specification, a vehicle rear-front direction, a lateral direction (vehicle widthwise direction), and a vertical direction are defined based on a driver sitting on a driver's seat.

As illustrated in FIGS. 1 to 5, a rear bumper beam 12 is made of fiber reinforced polymer and has an elongated body extending in its longitudinal direction which is disposed along the vehicle widthwise direction. The rear bumper beam 12 at both ends in the longitudinal direction is mounted on the rear ends of a pair of left and right rear side frames 11, 11 that are arranged to extend in the vehicle rear-front direction in a body rear part of an automobile. A bumper beam body 13 constituting the main body of the rear bumper beam 12 has: a bottom wall 14 that extends in the vertical direction; an upper wall 15 that extends forward from the upper end of the bottom wall 14; and a lower wall 16 that extends forward from the lower end of the bottom wall 14, and is formed to have a U-shaped cross section opening toward the front.

Figure 1:
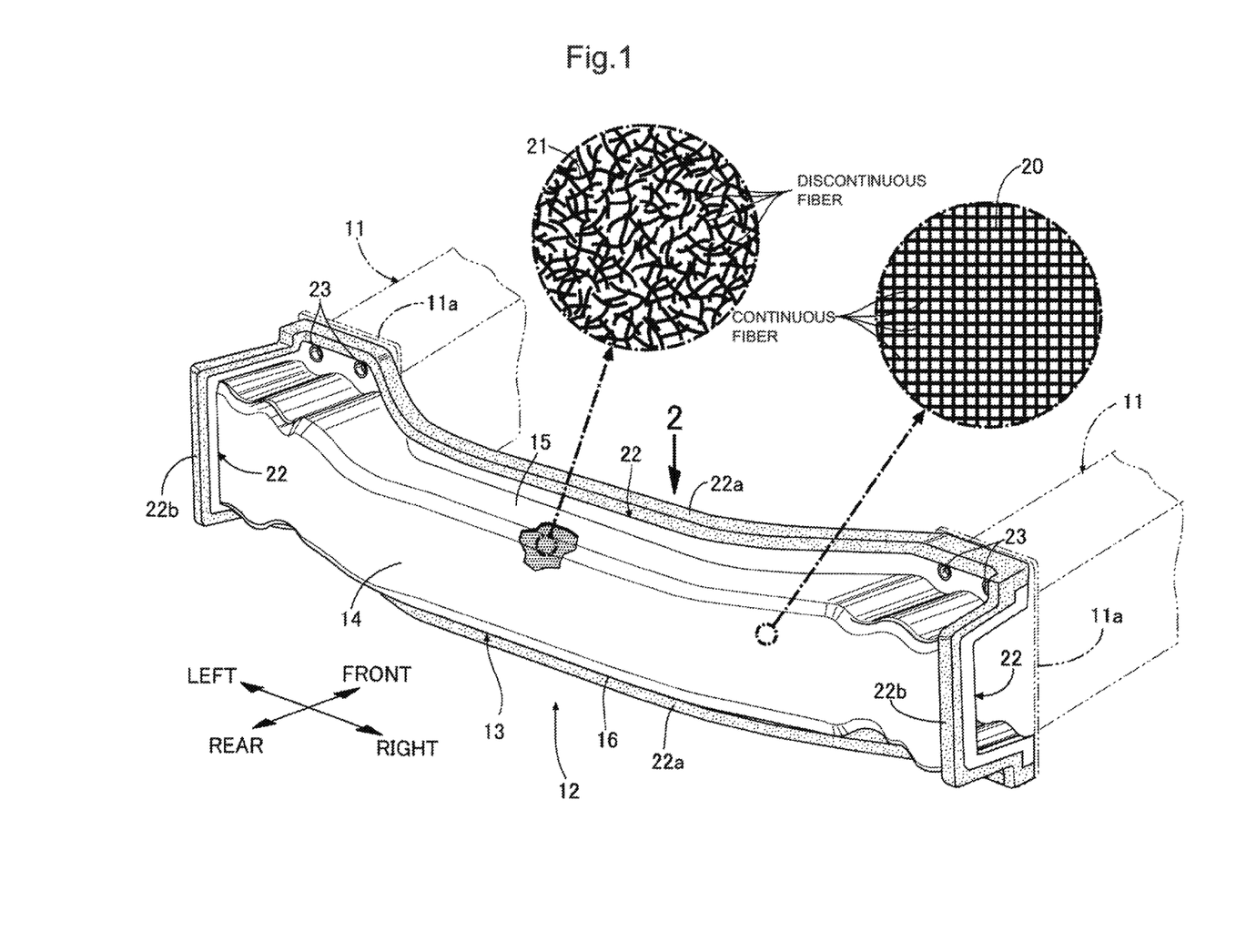
FIG. 1 is a perspective view of a rear bumper beam (first embodiment).
Figure 2:
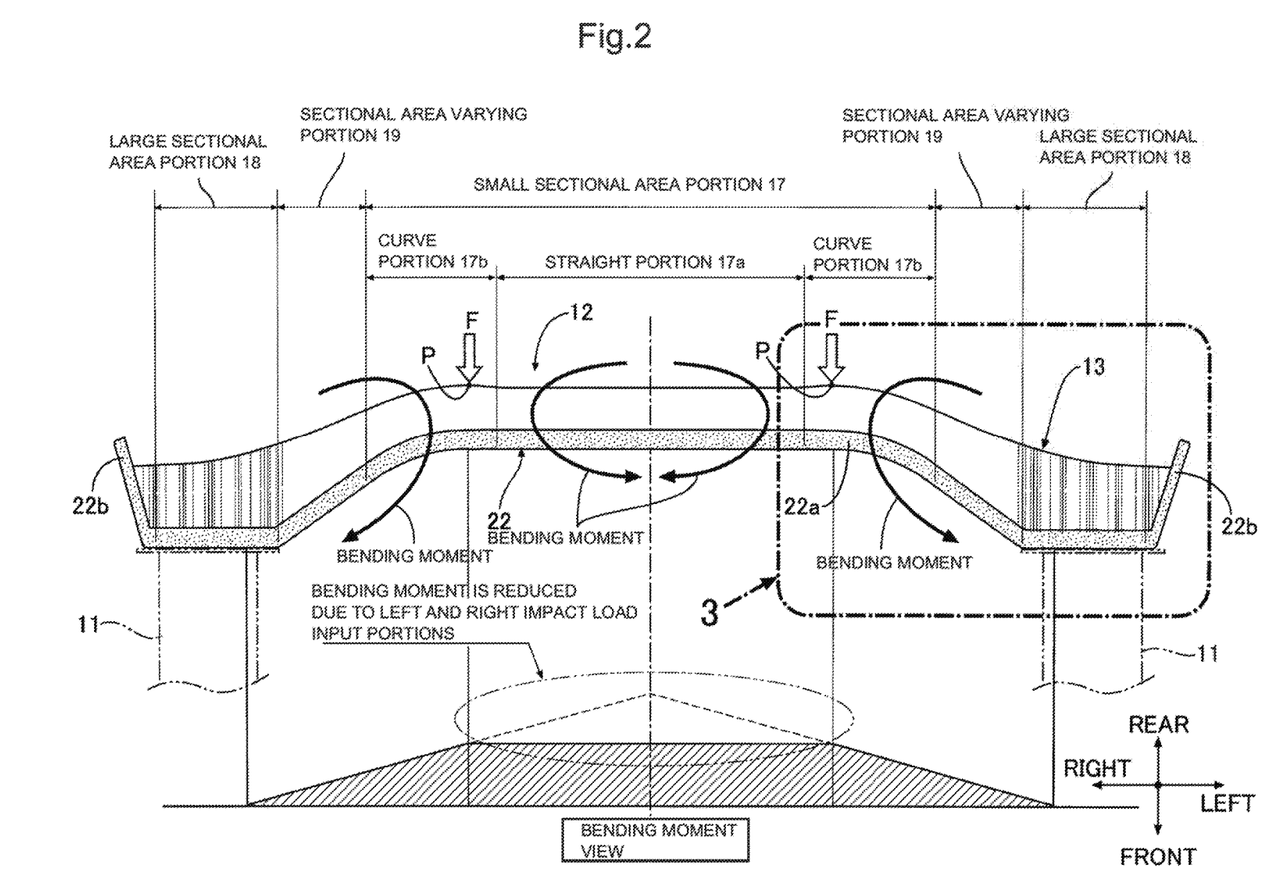
FIG. 2 is a view of FIG. 1 as seen in the direction of the arrow 2 (first embodiment).
Figure 3:
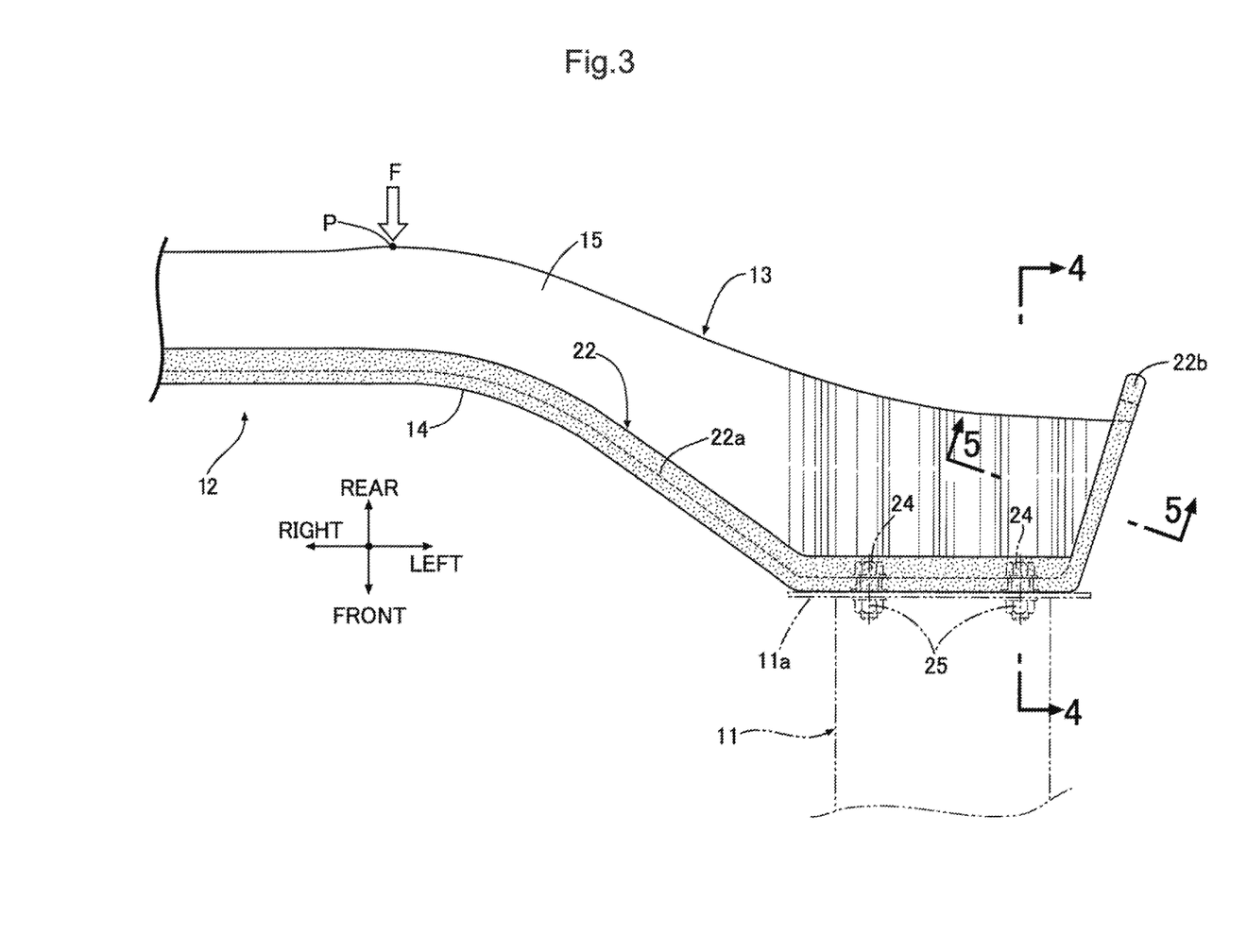
FIG. 3 is a view in which a portion 3 in FIG. 2 is enlarged (first embodiment).

The bumper beam body 13 is formed from: a small sectional area portion 17 that is located at the center in the vehicle widthwise direction and has a relatively small and substantially uniform section; large sectional area portions 18, 18 that are located at both ends in the vehicle widthwise direction and each have a relatively large and substantially uniform section; and a pair of left and right sectional area varying portions 19, 19 that connects the outer ends of the small sectional area portion 17 in the vehicle widthwise direction to the inner ends of the respective large sectional area portions 18, 18 in the vehicle widthwise direction, and the sectional area varying portions 19, 19 increase gradually in sectional area from the small sectional area portion 17 toward the large sectional area portions 18, 18.

In addition, the small sectional area portion 17 is formed from: a straight portion 17a that is located at the center in the vehicle widthwise direction and extends linearly; and a pair of left and right curve portions 17b, 17b that curve forward from the outer ends of the straight portion 17a in the vehicle widthwise direction toward the inner ends of the sectional area varying portions 19, 19 in the vehicle widthwise direction respectively. Areas near the inner ends of the curve portions 17b, 17b in the vehicle widthwise direction protrude rearward most, and the positions of these areas are impact load input portions P, P to which impact loads F, F are input upon rear crash.

The outer face of the bumper beam body 13, that is, the rear face of the bottom wall 14, the upper face of the upper wall 15, and the lower face of the lower wall 16 are constituted of a continuous fiber reinforced polymer layer 20 made by coupling glass continuous fibers to one another by thermoplastic resin such as nylon, and the inner face of the bumper beam body 13, that is, the front face of the bottom wall 14, the lower face of the upper wall 15, and the upper face of the lower wall 16 are constituted of a discontinuous fiber reinforced polymer layer 21 made by coupling glass discontinuous fibers to one another by thermoplastic resin such as nylon. The continuous fibers of the continuous fiber reinforced polymer layer 20 are oriented in the vehicle widthwise direction and in the vertical direction and vehicle rear-front direction orthogonal to the vehicle widthwise direction.

Further, a flange portion 22 protrudes on the entire outer circumferential edge of the bumper beam body 13, and the flange portion 22 also has a two-layered structure composed of the continuous fiber reinforced polymer layer 20 and discontinuous fiber reinforced polymer layer 21 extending continuously from the bumper beam body 13.

Figure 4:
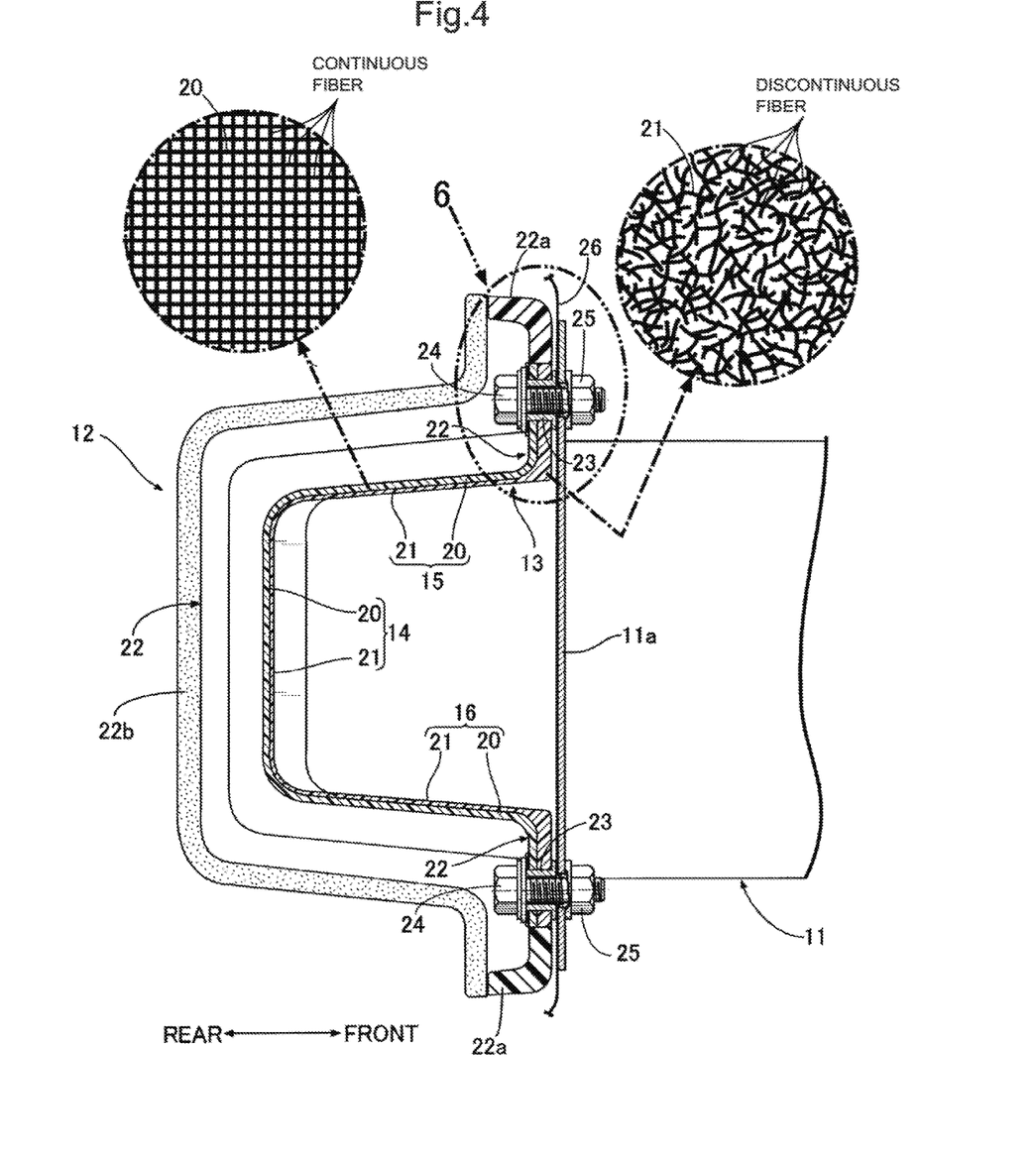
FIG. 4 is a sectional view taken along the line 4-4 in FIG. 3 (first embodiment).
Figure 5:
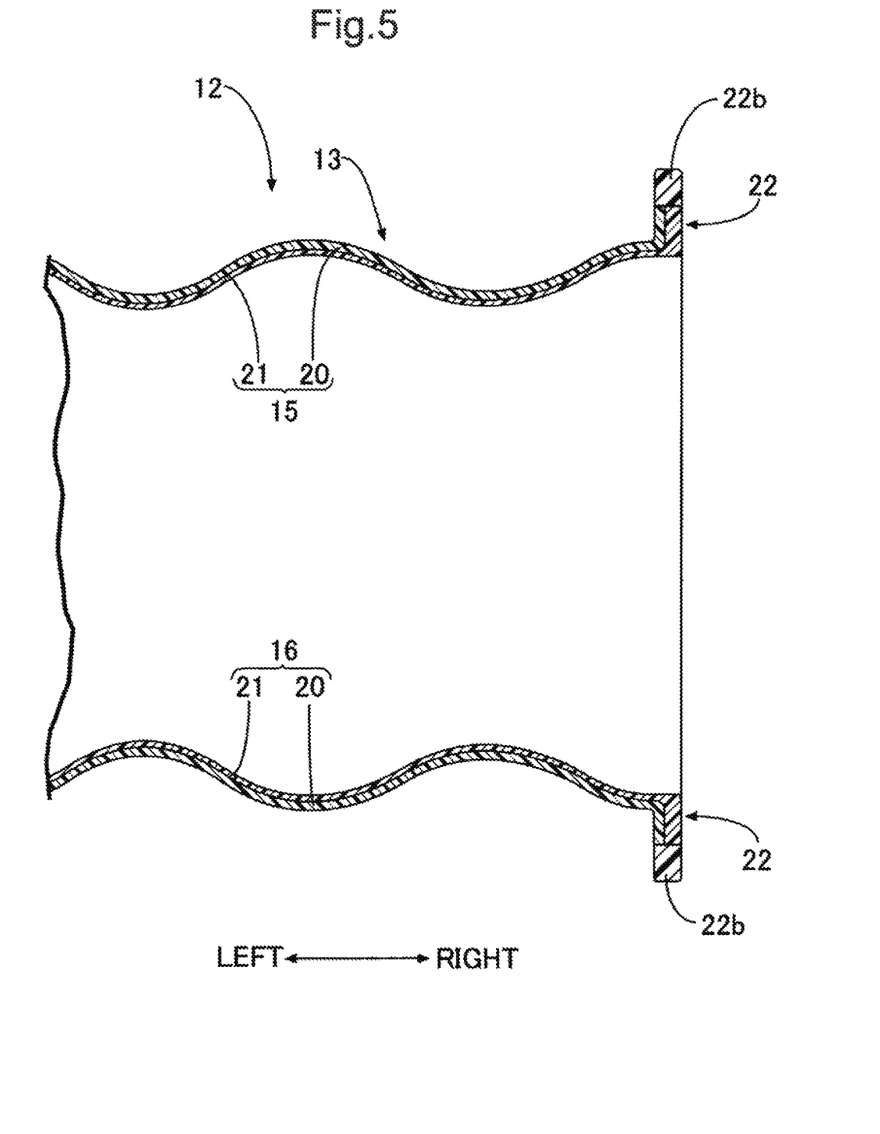
FIG. 5 is a sectional view taken along the line 5-5 in FIG. 3 (first embodiment).
Figure 6:
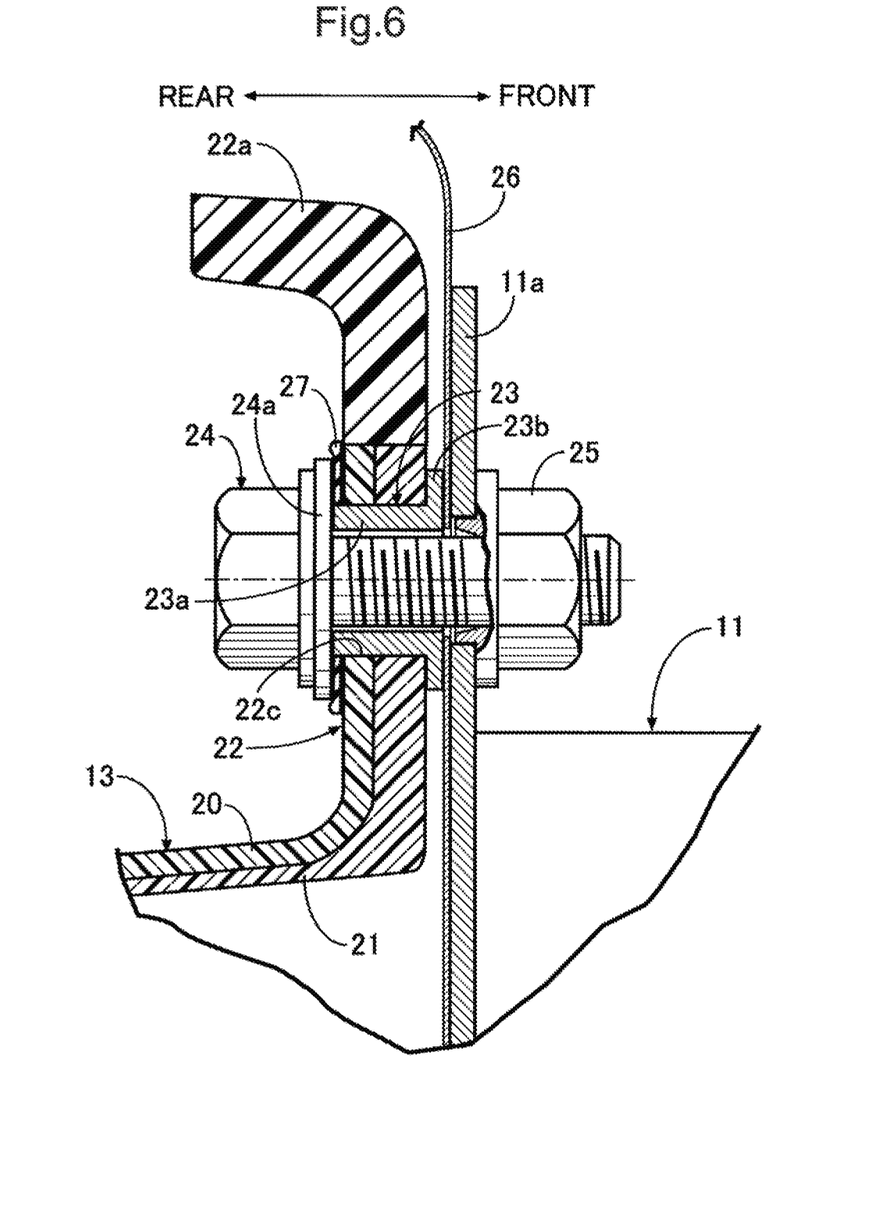
FIG. 6 is a view in which a portion 6 in FIG. 4 is enlarged (first embodiment).
Figure 7:
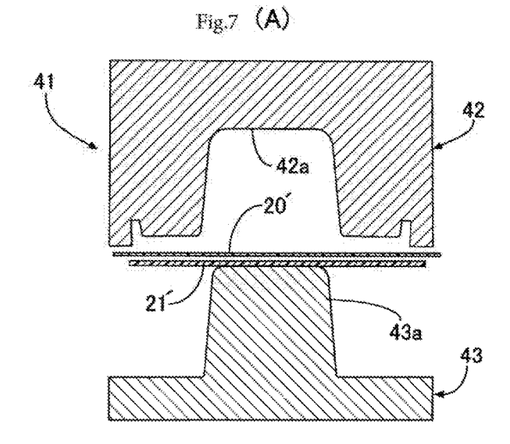
FIGS. 7(A) to 7(E) are explanatory views illustrating a process of molding a bumper beam (first embodiment).

As illustrated in FIGS. 4 to 6, a first flange tip portion 22a constituted of thermoplastic resin, such as nylon, containing no glass fiber is connected to the outer circumferential edge of the flange portion 22 in parts extending upward and downward respectively from a front edge of the upper wall 15 (an upper edge in the U-shaped cross section) and a front edge of the lower wall 16 (a lower edge in the U-shaped cross section) of the bumper beam body 13. The upper-side first flange tip portion 22a has an L-shaped cross section extending upward from the upper end of the upper-side flange portion 22 and then curving rearward, and, likewise, the lower-side first flange tip portion 22a has an L-shaped cross section extending downward from the lower end of the lower-side flange portion 22 and then curving rearward. Meanwhile, a second flange tip portion 22b constituted of thermoplastic resin, such as nylon, containing no glass fiber is connected to the outer circumferential edge of the flange portion 22 in parts extending rearward, upward, and downward respectively from the bottom wall 14, the upper wall 15, and the lower wall 16 defining the outer ends of the bumper beam body 13 in the vehicle widthwise direction. The second flange tip portion 22b has an I-shaped cross section and is formed so that the flange portion 22 is elongated as it is. These first flange tip portion 22a and second flange tip portion 22b are illustrated as a hatched pattern in the drawings.

The thickness of the continuous fiber reinforced polymer layer 20 is substantially uniform, and, by adjusting the thickness of the discontinuous fiber reinforced polymer layer 21 stacked on the continuous fiber reinforced polymer layer, the thickness of the flange portion 22 is set larger than the thickness of the bumper beam body 13. The thickness of the discontinuous fiber reinforced polymer layer 21 is the largest at the boundary between the bumper beam body 13 and the flange portion 22. The thickness of each of the first flange tip portion 22a and second flange tip portion 22b is the same as the thickness of the flange portion 22.

As illustrated in FIG. 7(A), a press-molding die 41 for press-molding the bumper beam body 13 and the flange portion 22 is formed from: a female die 42 that has a concave cavity 42a for molding the continuous fiber reinforced polymer layer 20; and a male die 43 that has a convex core 43a for molding the discontinuous fiber reinforced polymer layer 21. First, with the press-molding die 41 open, a continuous fiber prepreg 20' and a discontinuous fiber prepreg 21' which have been preheated are arranged between the cavity 42a of the female die 42 and the core 43a of the male die 43.

Next, as illustrated in FIG. 7(B), the bumper beam body 13 and the flange portion 22 are press-molded by clamping the press-molding die 41. At this time, parts corresponding to the first flange tip portion 22a and the second flange tip portion 22b extending continuously from the flange portion 22 are left as a space 44 where no glass fiber nor resin exists. Subsequently, as illustrated in FIG. 7(C), the first flange tip portion 22a and the second flange tip portion 22b are molded by injecting molten thermoplastic resin in the space 44. In this way, the first flange tip portion 22a and the second flange tip portion 22b are molded by use of the press-molding die 41 for molding the bumper beam body 13 and the flange portion 22, so that facility cost and processing man-hours can be reduced.

After the rear bumper beam 12 thus molded is taken out from the press-molding die 41, mounting holes 22c . . . are machined in the flange portion 22 as illustrated in FIG. 7(D). Then, as illustrated in FIG. 6(E), flanged collars 23 . . . are fixed in the mounting holes 22c . . . of the flange portion 22 by press fitting or riveting, whereby the rear bumper beam 12 is completed.

As illustrate in FIG. 6, the flanged collars 23 . . . are respectively fitted in the three mounting holes 22c . . . formed in each of the upper and lower parts of the flange portion 22 at both end parts of the rear bumper beam 12 in the vehicle widthwise direction. Each flanged collar 23 has a flange 23b that protrudes radially outward from the front end of a body portion 23a, and the body portion 23a is fitted in the mounting hole 22c of the flange portion 22 and the flange 23b comes in contact with the front face of the flange portion 22. A weld nut 25 is welded to the front face of a mounting plate 11a designed to close the rear end of each rear side frame 11. A flanged bolt 24 penetrates the flanged collar 23, a rear panel 26, and the mounting plate 11a from the rear and is screwed in the weld nut 25 while the rear panel 26 is interposed between the rear face of the mounting plate 11a and the front face of the flange 23b of the flanged collar 23, whereby the rear bumper beam 12 is fixed on the left and right mounting plates 11a, 11a. At this time, a ring-shaped elastic member 27 constituted of rubber or the like is disposed between a flange 24a of the flanged bolt 24 and the rear face of the flange portion 22 of the rear bumper beam 12.

Meanwhile, if the rear end of the body portion 23a of the flanged collar 23 protrudes from the rear face of the flange portion 22 of the rear bumper beam 12, no fastening force of the flanged bolt 24 acts directly on the flange portion 22 of the rear bumper beam 12 and thus the flange portion 22 of the rear bumper beam 12 is held only by the frictional force between itself and the flanged collar 23, which makes vibration and noise more likely to occur. However, since the elastic member 27 is disposed around the protruding portion of the body portion 23a of the flanged collar 23 located at its rear end, the fastening force of the flanged bolt 24 acts on the rear face of the flange portion 22 of the rear bumper beam 12 via the compressed elastic member 27, whereby the rear bumper beam 12 can be fixed firmly, and vibration and noised can be prevented.

Next, a description is given of the operation of the embodiment of the present invention having the above configuration.

Assume a case where a front bumper of another car collides lightly with a rear bumper of your own car. In the case of an existing rear bumper beam simply curved to protrude rearward, because an impact load is input in a concentrated way to one point at the center of this bumper beam in the vehicle widthwise direction, there is a problem that a large bending moment acts on a central part of this rear bumper beam in the vehicle widthwise direction.

On the other hand, the rear bumper beam 12 of this embodiment illustrated in FIG. 2 includes the pair of left and right impact load input portions P, P protruding rearward most, and thus the impact loads F, F are input to the pair of impact load input portions P, P in a concentrated way. This reduces the largest value of the bending moment to act on a central part of the rear bumper beam 12 in the vehicle widthwise direction, whereby the strength of the rear bumper beam 12 against bending deformation can be increased.

Moreover, since the bumper beam body 13 includes the small sectional area portion 17 at the center in the vehicle widthwise direction, the pair of sectional area varying portions 19, 19 which extend continuously from the outer sides of the small sectional area portion 17 in the vehicle widthwise direction and whose sectional areas increase gradually, and the pair of large sectional area portions 18, 18 which extend continuously from the outer sides of the sectional area varying portions 19, 19 in the vehicle widthwise direction, the sectional area varying portions 19, 19 and the large sectional area portions 18, 18 support the bending moment upon input of the impact loads F, F to the pair of impact load input portions P, P. Thereby, it is possible to increase the strength of the bumper beam body 13 while reducing the thickness of the bumper beam body for weight reduction.

Further, the bumper beam body 13 and the flange portion 22 are each a layered body composed of at least two layers including: the continuous fiber reinforced polymer layer 20 made by coupling glass continuous fibers to one another by thermoplastic resin with these fibers oriented in the vehicle widthwise direction and in the directions orthogonal to the vehicle widthwise direction; and the discontinuous fiber reinforced polymer layer 21 made by coupling glass discontinuous fibers to one another by thermoplastic resin with these fibers oriented in random directions. Thus, by using the expensive continuous fiber reinforced polymer layer 20 and the inexpensive discontinuous fiber reinforced polymer layer 21 in combination to make the bumper beam body 13, it is possible to secure strength necessary for the rear bumper beam 12 by use of the high-strength continuous fiber reinforced polymer layer 20 while reducing cost as compared with the case where the whole bumper beam body 13 is constituted of the expensive continuous fiber reinforced polymer layer 20.

Meanwhile, since the bumper beam body 13 and the flange portion 22 of the rear bumper beam 12 each have a two-layered structure composed of the continuous fiber reinforced polymer layer 20 and the discontinuous fiber reinforced polymer layer 21 and hence the edges of the flange portion 22 are constituted of cut surfaces of the continuous fiber prepreg 20' and the discontinuous fiber prepreg 21', the tip of cut glass fibers and a part of matrix resin of the continuous fiber reinforced polymer layer 20 and the discontinuous fiber reinforced polymer layer 21 protrude from the edges of the flange portion 22 as flash. If the sharp tip of the glass continuous fiber layer contained in the continuous fiber reinforced polymer layer 20 protrudes as flash, in particular, this flash might come in contact with the hands of an operator and degrade workability or might degrade the appearance of the product. For this reason, it has been heretofore necessary to perform trimming where the edges of the flange portion 22 are cut to smoothen them.

However, according to this embodiment, the edges of the flange portion 22 at the outer circumference of the rear bumper beam 12, where flash sticks out, are covered with the first flange tip portion 22a and the second flange tip portion 22b. Thereby, it is possible to prevent protrusion of flash and improve product quality while no trimming for removing flash is required.

Meanwhile, if the continuous fiber prepreg 20' and the discontinuous fiber prepreg 21' are misaligned in position when they are set inside the press-molding die 41 and the edges of the continuous fiber prepreg 20' and the discontinuous fiber prepreg 21' protrude deep inside the space 44 (see FIG. 7(C)) of the press-molding die 41, synthetic resin for molding the first flange tip portion 22a and the second flange tip portion 22b cannot be flowed into the space 44 enough and therefore it might become unable to fully cover flash with the first flange tip portion 22a or the second flange tip portion 22b. However, in this embodiment, since especially the first flange tip portion 22a is formed to have an L-shaped cross section, the edges of the continuous fiber prepreg 20' and the discontinuous fiber prepreg 21' never reach the tip of this L-shaped cross section, thus making it possible to fully cover flash with the first flange tip portion 22a and prevent it from sticking out.

In addition, the rear bumper beam 12 has a two-layered structure made by stacking the continuous fiber reinforced polymer layer 20 and the discontinuous fiber reinforced polymer layer 21 one on top of the other, and the discontinuous fiber reinforced polymer layer 21 in the flange portion 22 is thicker than the discontinuous fiber reinforced polymer layer 21 in the bumper beam body 13. Thus, the discontinuous fiber reinforced polymer layer 21 excellent in moldability makes it easy to thicken the flange portion 22, and the mounting strength of the rear bumper beam 12 can be increased by the thick flange portion 22.

Further, since the discontinuous fiber reinforced polymer layer 21 is the thickest at the boundary part between the bumper beam body 13 and the flange portion 22, the freedom in the position of the continuous fiber reinforced polymer layer 20 at the boundary part is increased, which enables the continuous fiber reinforced polymer layer 20 to curve smoothly without bending sharply. Thereby, it is possible to prevent glass continuous fibers from being broken due to the sharp curve of the continuous fiber reinforced polymer layer 20 at the boundary part at the time of press-molding the rear bumper beam 12 in the press-molding die 41.

Second Embodiment

Figure 8:
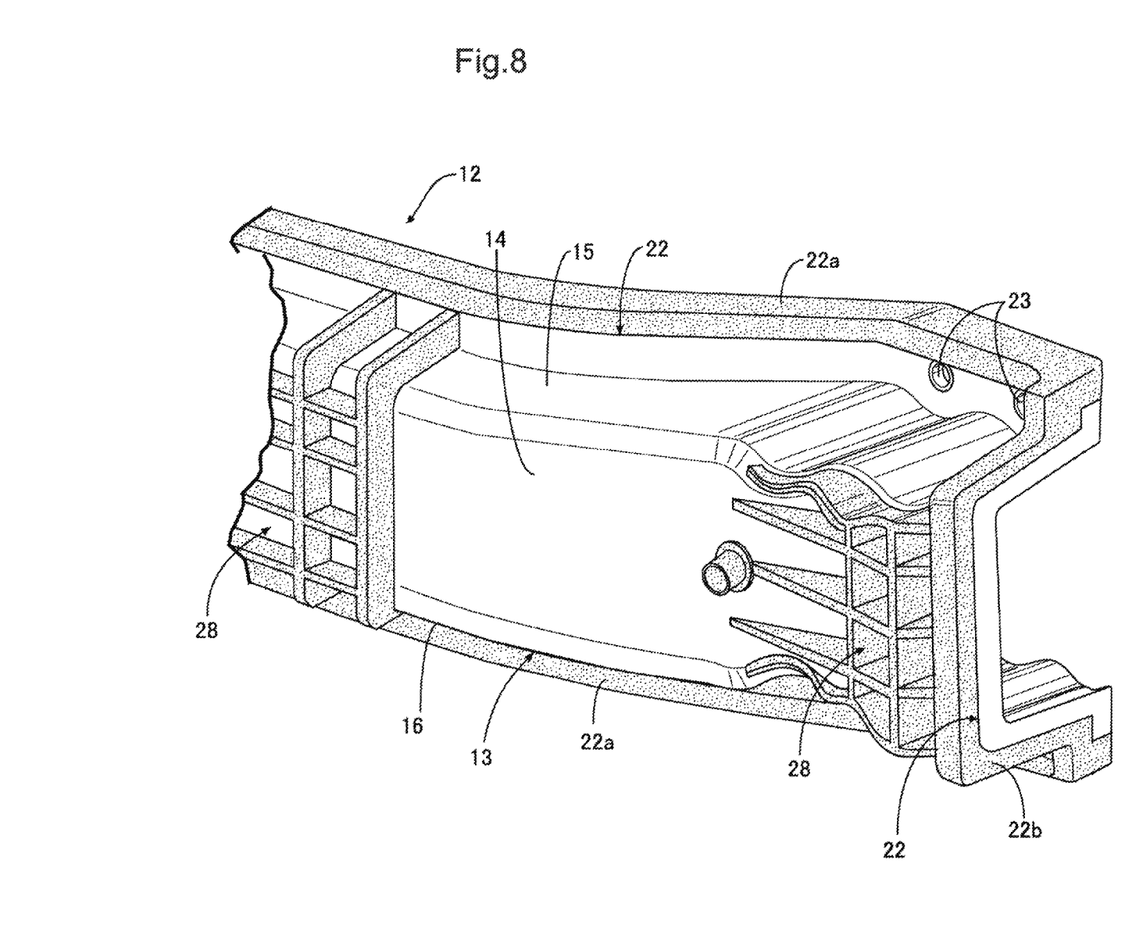
FIG. 8 is a perspective view of a rear bumper beam (second embodiment).

Next, a second embodiment of the present invention is described on the basis of FIG. 8.

The rear bumper beam 12 according to the second embodiment includes honeycomb structures 28 . . . in a central part of the bumper beam body 13 in the vehicle widthwise direction and both end parts thereof in the vehicle widthwise direction. The honeycomb structures 28 . . . are made of thermoplastic synthetic resin, and are injection molded at the same time as the injection molding of the first flange tip portion 22a and the second flange tip portion 22b.

According to this embodiment, the honeycomb structures 28 . . . are collapsed in the event of a light collision from the rear or oblique rear, whereby collision energy can be absorbed efficiently.

Although the embodiments of the present invention have been described above, various design changes can be made to the present invention without departing from the gist thereof.

For example, although the rear bumper beam 12 has been described in the embodiments, the present invention is also applicable to a front bumper beam. In the case of the rear bumper beam 12, the outer side in the vehicle rear-front direction corresponds to the rear and, in the case of the front bumper beam, the outer side in the longitudinal direction corresponds to the front.

DESCRIPTION OF REFERENCE NUMERALS

11a MOUNTING PLATE (BODY FRAME MEMBER)
12 REAR BUMPER BEAM (BUMPER BEAM)
13 BUMPER BEAM BODY
20 CONTINUOUS FIBER REINFORCED POLYMER LAYER
20' CONTINUOUS FIBER PREPREG (PREPREG)
21 DISCONTINUOUS FIBER REINFORCED POLYMER LAYER
21' DISCONTINUOUS FIBER PREPREG (PREPREG)
22 FLANGE PORTION
22a FIRST FLANGE TIP PORTION
22b SECOND FLANGE TIP PORTION
22c MOUNTING HOLE
23 FLANGED COLLAR (COLLAR)
23b FLANGE
24 FLANGED BOLT
24a FLANGE
27 ELASTIC MEMBER
28 HONEYCOMB STRUCTURE
41 PRESS-MOLDING DIE
42 FEMALE DIE
43 MALE DIE
44 SPACE

The invention claimed is:

1. A method for manufacturing a bumper beam which comprises: the bumper beam a bumper beam body that has an elongated body disposed along the vehicle widthwise direction and a U-shaped cross section an inside of which is opened toward a vehicle inner side in a vehicle rear-front direction, an upper edge and a lower edge of the U-shaped cross section extending outward from the bumper beam body, thereby forming a flange portion, said bumper beam body and said flange portion thereof each containing a continuous fiber reinforced polymer layer; and a first flange tip portion that is made of thermoplastic resin and provided to the upper edge and the lower edge of the flange portion such that the first flange tip portion covers the upper edge and the lower edge, the first flange tip portion extending from the upper edge or the lower edge outward in a vertical direction and then curving outward in the vehicle rear-front direction, thereby forming an L-shaped cross section, the method comprising:

a first step of hot pressing a prepreg in a press-molding die and thereby molding the prepreg in a shape of said bumper beam body and said flange portion in a manner that leaves a space shaped in said first flange tip portion at a position along the upper and lower edges of said flange portion in the press-molding die; and a second step of injecting thermoplastic resin in the space formed in said press-molding die and thereby molding said first flange tip portion.

2. The method according to claim 1, further comprising:

a third step of forming a mounting hole in said flange portion after said second step; and a fourth step of fixing a collar in said mounting hole by press fitting or riveting.

3. The method according to claim 2, wherein in said first step, said prepreg is made of a discontinuous fiber prepreg and a continuous fiber prepreg stacked one on top of the other, and a clearance between molding faces of a female die and a male die of said press-molding die at a boundary between said bumper beam body and said flange portion is larger than the clearance in other parts.

4. A structure for mounting a bumper beam to a vehicle body, the structure comprising:

a mounting hole formed at the flange portion of the bumper beam which comprises: a bumper beam body that has an elongated body disposed along the vehicle widthwise direction and a U-shaped cross section an inside of which is opened toward a vehicle inner side in a vehicle rear-front direction, an upper edge and a lower edge of the U-shaped cross section extending outward from the bumper beam body, thereby forming a flange portion, said bumper beam body and said flange portion thereof each containing a continuous fiber reinforced polymer layer; and a first flange tip portion that is made of thermoplastic resin and provided to the upper edge and the lower edge of the flange portion such that the first flange tip portion covers the upper edge and the lower edge, the first flange tip portion extending from the upper edge or the lower edge outward in a vertical direction and then curving outward in the vehicle rear-front direction, thereby forming an L-shaped cross section;

a body frame member of the vehicle body;

a flanged collar integrally having a collar flange that is fitted in the mounting hole of said flange portion of the bumper beam from the vehicle inner side in the vehicle rear-front direction;

a flanged bolt integrally having a bolt flange that is caused to penetrate said flanged collar from a vehicle outer side in the vehicle rear-front direction and fastened to said body frame member; and an elastic member interposed between said bolt flange of said flanged bolt and said flange portion of said bumper beam on the vehicle outer side in the rear-front direction.

* * * * *